United States Patent
Yoshida et al.

(10) Patent No.: US 8,073,381 B2
(45) Date of Patent: Dec. 6, 2011

(54) RADIO COMMUNICATION SYSTEM AND BASE STATION

(75) Inventors: Akihiko Yoshida, Yokohama (JP); Shiro Mazawa, Yokohama (JP); Kiyoshi Kawamoto, Yokohama (JP); Yosuke Takahashi, Yokohama (JP); Keiji Usuba, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 560 days.

(21) Appl. No.: 12/235,684

(22) Filed: Sep. 23, 2008

(65) Prior Publication Data

US 2009/0023382 A1    Jan. 22, 2009

Related U.S. Application Data

(62) Division of application No. 11/039,480, filed on Jan. 19, 2005, now abandoned.

(30) Foreign Application Priority Data

Jun. 25, 2004   (JP) ................................. 2004-187223

(51) Int. Cl.
    *H04Q 7/20* (2006.01)
(52) U.S. Cl. .................. 455/3.01; 455/445; 455/432.1; 455/414.1; 455/414.2; 455/550.1; 370/310; 370/328; 370/343; 370/329; 370/350
(58) Field of Classification Search ........ 455/3.01–3.06, 455/436–444, 432.1–432.3, 522, 69.1, 500, 455/517, 445, 550.1, 466, 414.1–414.4, 403, 455/422.1; 370/310, 328, 343, 329, 350
See application file for complete search history.

(56) References Cited

U.S. PATENT DOCUMENTS

| | | | |
|---|---|---|---|
| 5,673,322 A | 9/1997 | Pepe et al. | |
| 6,021,123 A | 2/2000 | Mimura | |
| 6,493,551 B1 | 12/2002 | Wang et al. | |
| 6,636,743 B1 * | 10/2003 | Vicharelli et al. | 455/456.1 |
| 6,654,608 B1 * | 11/2003 | Monell et al. | 455/436 |
| 7,092,722 B1 * | 8/2006 | Oh et al. | 455/456.1 |
| 2002/0082017 A1 | 6/2002 | Hattori | |
| 2003/0134640 A1 | 7/2003 | Kim et al. | |
| 2003/0190920 A1 | 10/2003 | An | |
| 2004/0243712 A1 | 12/2004 | Sakai et al. | |

FOREIGN PATENT DOCUMENTS

| | | |
|---|---|---|
| JP | 09-187055 A | 7/1997 |
| JP | 2002-199428 A | 7/2002 |
| WO | WO03/171797 A1 | 8/2003 |

OTHER PUBLICATIONS

"CDMA2000 High Rate Broadcast-Multicast Packet Data Air Interface Specification," 3rd Generation Partnership Project 2 (3GPP2), Version 1.0 (Feb. 2004).
Japan Patent Office (JPO) office action for JPO patent application JP2004-187223 (Feb. 16, 2010).
Japan Patent Office (JPO) office action for JPO patent application JP2004-187223 (Nov. 17, 2009).

* cited by examiner

*Primary Examiner* — Keith Ferguson
(74) *Attorney, Agent, or Firm* — Kilpatrick Townsend & Stockton LLP

(57) ABSTRACT

A radio communication system includes a grouping unit for grouping a plurality of base stations into a plurality of groups (Soft Handoff Groups) and a determining unit for selecting base stations belonging to one and the same group selected from the groups produced by the grouping unit and for determining the base stations as base stations to send communication packets to an access terminal.

5 Claims, 17 Drawing Sheets

FIG. 5
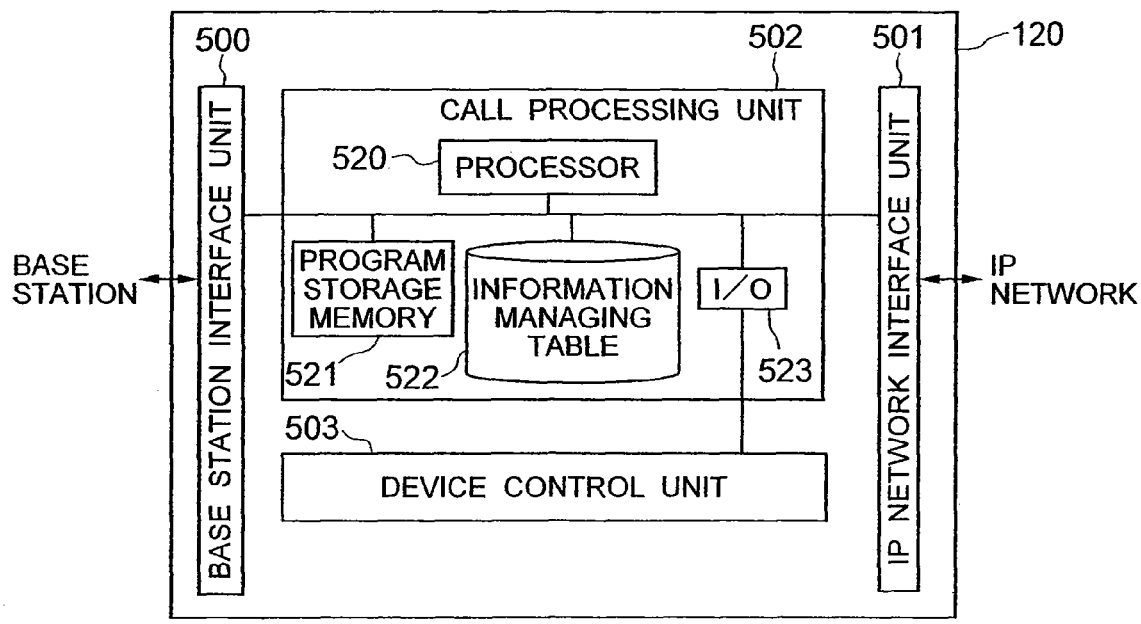
FIG. 6
| 522-1 | 522-2 | 522-3 | 522-4 |
|---|---|---|---|
| FLOW ID | DATA RATE | TRANSMISSION TIME | TRANSMISSION TIMING |
| 10 | α kbps | β | T1 |
| ⋮ | ⋮ | ⋮ | ⋮ |
FIG. 7
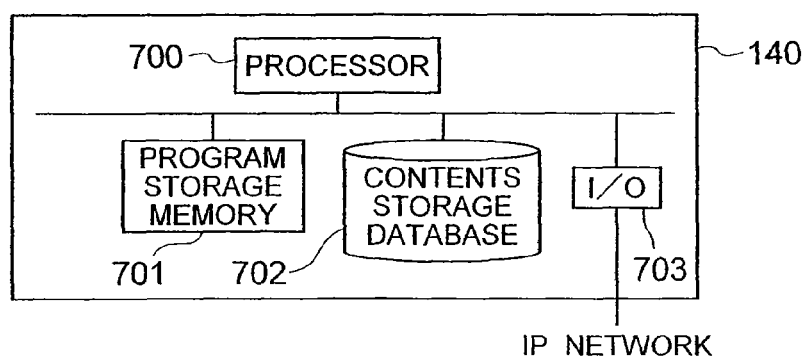

FIG. 10
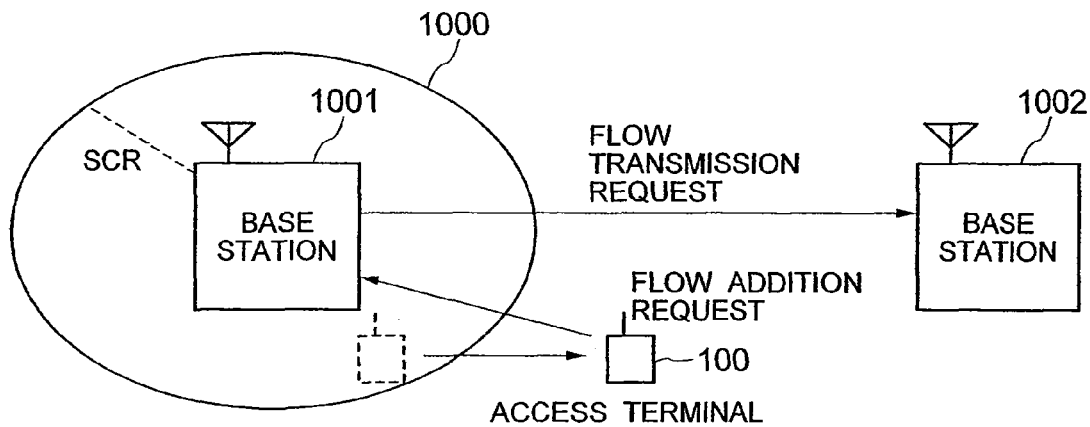
FIG. 11
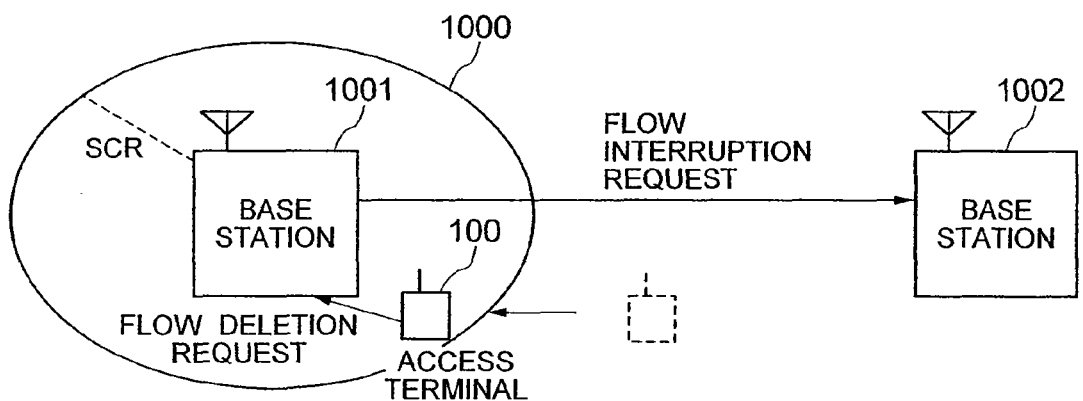
FIG. 12
| SECTOR No. | SCR |
|---|---|
| 1 | x1 |
| ⋮ | ⋮ |

| SECTOR No. | SCD | POSITIONAL INFORMATION | POWER INFORMATION |
|---|---|---|---|
| 1 | x2 | p | 6 |
| ⋮ | ⋮ | ⋮ | ⋮ |

FIG. 20

| BASE STATION NAME (2100-1) | SECTOR No. (2100-2) | RECEIVED POWER VALUE (2100-3) |
|---|---|---|
| BASE STATION 1 | SECTOR 1 | P1 |
|  | SECTOR 2 | P2 |
| ⋮ | ⋮ | ⋮ |

| ADJACENT BASE STATION LIST (2200-1) | SECTOR No. (2200-2) | STATISTIC INFORMATION (2200-3) |
|---|---|---|
| BASE STATION 2 (1901) | SECTOR 1 | 1 |
| BASE STATION 3 (1902) | SECTOR 1 | 2 |
| BASE STATION 4 (1903) | SECTOR 1 | 1 |
| BASE STATION 5 (1904) | SECTOR 1 | 1 |
| ⋮ | ⋮ | ⋮ |

2200

RADIO COMMUNICATION SYSTEM AND BASE STATION

INCORPORATION BY REFERENCE

The present application claims priority from Japanese application JP2004-187223 filed on Jun. 25, 2004, the content of which is hereby incorporated by reference into this application.

BACKGROUND OF THE INVENTION

The present invention relates to a radio communication system and a base station in which a plurality of base stations transmit the same communication information such as the same voice and sound and data at same timing to an access terminal and the access terminal combines the communication information with each other to restore the original data stream.

In the field of communications in recent years, the broadband communication has been broadly developed, routers have been technically advanced, and a need of users to receive, for example, streaming video images having a large capacity or including a large amount of data is increasing. In association therewith, attention has been attracted to a multicast communication technique to broadcast data as well as voice and sound having a large capacity using a few communication resources as compared with a unicast communication technique. "Multicast" is a technique to simultaneously transmit the same communication information such as the same data and/or voice and sound to a plurality of user terminals. "Unicast" is a technique to conduct communication with each user terminal with a one-to-one correspondence established therebetween.

Therefore, when plural access terminals have received the same voice or data by using the multicast, the traffic on the communication can be advantageously reduced when compared with the case using the unicast.

Also, in the field of radio communication such as Evolution Data Only (1xEVDO) using, for example, a Code Division Multiple Access (CDMA), there has been discussed a communication technique in which to improve efficiency of use of radio bands, one data stream can be received by a plurality of access terminals. Heretofore, a physical channel is assigned to each access terminal to establish radio connection for communication therebetween. That is, one-to-one unicast communication is carried out. By assigning one particular channel one the physical channels as a multicast channel, one data stream is sent to a plurality of access terminals. This improves efficiency of use of radio bands.

For efficient use of frequencies, each of the base stations constituting a radio communication system includes a plurality of sectors. An electric wave receiving state of the access terminal varies depending on a wave propagation environment between the access terminal and the base stations. In the unicast, one-to-one communication is conducted between an access terminal and a base station (sector). Therefore, the base station (sector) can control the communication. For example, the base station increases, for each access terminal, a data rate of a data stream when the wave propagation state is good for the access terminal and decreases the data rate thereof when the wave propagation state is unsuitable or is not good for the access terminal. In the multicast, it is required for the access terminal to receive a data stream sent from the base station (sector) at a particular data rate stipulated for the multicast. Therefore, since the data rate of the data stream received by the access terminal varies depending on the wave propagation environment, when the data stream is sent from the base station (sector) at a high data rate in the multicast, an access terminal at a position in a deteriorated or bad wave propagation environment cannot receive the data stream. When the data rate is low, throughput of the communication is reduced.

Reception sensitivity of a signal received by the access terminal depends on a ratio between an actual data signal level of the received data signal and a noise signal level thereof. Therefore, to enable the multicast data stream to be received by as many access terminals as possible, it is only necessary to increase the ratio of the actual data signal level to the noise signal level.

However, since a base station (sector) in a best wave propagation environment is selected for communication in the conventional unicast communication, substantially all electric waves sent from base stations (sectors) not selected as communication targets become interference noise. The 3rd Generation Partnership Project 2 (3GPP2) C.S0054 Version 1.0 describes a method in which a plurality of base stations (sectors) transmit at same timing the same data stream using the same frequency to the access terminal. The access terminal combines data signals of the data streams with each other to restore the original data stream to thereby increases the ratio of the actual data signal level to the noise signal level. As a result, an increased number of access terminals can receive data streams multicast at a high data rate. In a technique called Soft Combine, the same data streams sent from a plurality of base stations (sectors) at same timing are combined with each other and restored into the original data stream by the access terminal. This increases the ratio of the actual data signal level to the noise signal level of the signal received by the access terminal to thereby improve data stream reception quality.

Timing to transmit the data stream is sent from the base stations (sectors) to the access terminals at a fixed interval of time.

SUMMARY OF THE INVENTION

A data stream multicast from a base station (sector) to an access terminal will be referred to as a BroadCast/MultiCast Service (BCMCS) flow (hereinafter just represented as "flow"). As described above, to achieve the Soft Combine, it is required for a plurality of base stations (sectors) to transmit the same flows at the same timing.

However, when all base stations (sectors) disposed in the radio communication system send the same flows at the same timing to access terminals, radio bands are not efficiently used. The maximum number of base stations (sectors) from which an access terminal can receive flows depends on performance of the access terminal. Therefore, when flows are sent from base stations (sectors) of which the number exceeds the maximum number, radio bands are not efficiently used. It is necessary to determine the number of base stations (sectors) to transmit flows so that utilization efficiency of radio bands is kept optimized. However, the 3GPP2 C.S0054 Version 1.0 does not describe any method of implementing the optimization of radio band utilization efficiency.

It is an object of the present invention to provide a radio communication system and base stations which can dynamically determine a sector to be communicated with an access terminal and efficiently perform the soft combine in the radio communication system under the unstable radio wave propagation environment.

To achieve the object, there is provided a radio communication system according to the present invention. The system includes an access terminal, a plurality of base stations communicable with the access terminal, a grouping unit for grouping the base stations into a plurality of groups in association with Soft Handoff, and a determining unit for selecting, from the base stations, base stations belonging to one of the groups produced by the grouping unit, and for determining the base stations as base stations which send communication packets to the access terminal.

According to the present invention, there is provided a radio communication system. The system includes an access terminal, a plurality of base stations communicable with the access terminal, a calculating unit for calculating distance between the access terminal and a first base station selected from the base stations, according to respective positional information of the access terminal and the first base station; a comparing unit for comparing a calculated result calculated by the calculating unit with a predetermined parameter (Soft Combine Radius (SCR)), and a requesting unit for requesting, according to a result of the comparison by the comparing unit, a second base station selected from the base stations to send a communication packet to the access terminal.

According to the present invention, there is provided a radio communication system. The system includes an access terminal, a plurality of base stations communicable with the access terminal, a calculating unit for calculating distance between a first base station selected from the base stations and a second base station selected from the base stations, according to respective positional information of the first and second base stations; a comparing unit for comparing a calculated result calculated by the calculating unit with a predetermined parameter (Soft Combine Distance (SCD)), and a determining unit for determining, according to a result of the comparison from the comparing unit, base stations selected from the base stations base stations which send communication packets to the access terminal.

According to the present invention, there is provided a radio communication system. The system includes a plurality of access terminals, a plurality of base stations communicable with the access terminals, a power measuring unit for measuring received power received from each of the base stations, a collecting unit for comparing a measured result measured by the power measuring unit with a predetermined power threshold value and collecting information from base stations selected from the base stations, the base stations being associated with received power exceeding the power threshold value; and a determining unit for determining, according to a collection result collected by the collecting unit, base stations selected from the base stations, the base stations being to communicate with the access terminals.

According to the present invention, there are provided a base stations for use in a radio communication system comprising a plurality of access terminals and a plurality of base stations communicable with the access terminals. Each of the base stations includes a receiving unit for receiving, from each of the access terminals, information of base stations selected from the base stations, the base stations associated with high received power; and a determining unit for executing statistic processing for the information of the base stations received by the receiving unit, thereby producing statistic information and determining, according to the statistic information, base stations selected from the base stations, the base stations being to communicate with the access terminals.

According to the present invention implementing the configurations described above, there can be provided a radio communication system and a base station. Accordingly, in a radio communication system in a wave propagation environment varying with a lapse of time, base stations (sectors) to communicate with access terminals are dynamically determined to efficiently achieve Soft Combine.

Unnecessary use of the radio band can be prevented and hence the radio resources can be efficiently used.

Other objects, features and advantages of the invention will become apparent from the following description of the embodiments of the invention taken in conjunction with the accompanying drawings.

BRIEF DESCRIPTION OF THE DRAWINGS

FIG. 5 is a block diagram showing a configuration of a communication controller 120.

FIG. 6 is a diagram showing a layout of an information managing table 522 disposed in the communication controller.

FIG. 7 is a block diagram showing a configuration of a contents server 140.

FIG. 10 is a diagram showing an outline of operation in a second embodiment of a radio communication system.

FIG. 11 is a diagram also showing an outline of operation in the second embodiment of a radio communication system.

FIG. 12 is a block diagram showing a configuration of a table 1200 disposed in a base station.

FIG. 20 is a diagram showing a layout of a table 2100 disposed in an access terminal.

FIG. 21 is a diagram showing a layout of a table 2200 disposed in a base station.

DESCRIPTION OF THE EMBODIMENTS

Description will now be given in detail of embodiments of the present invention.

1. First Embodiment

Figure 1:
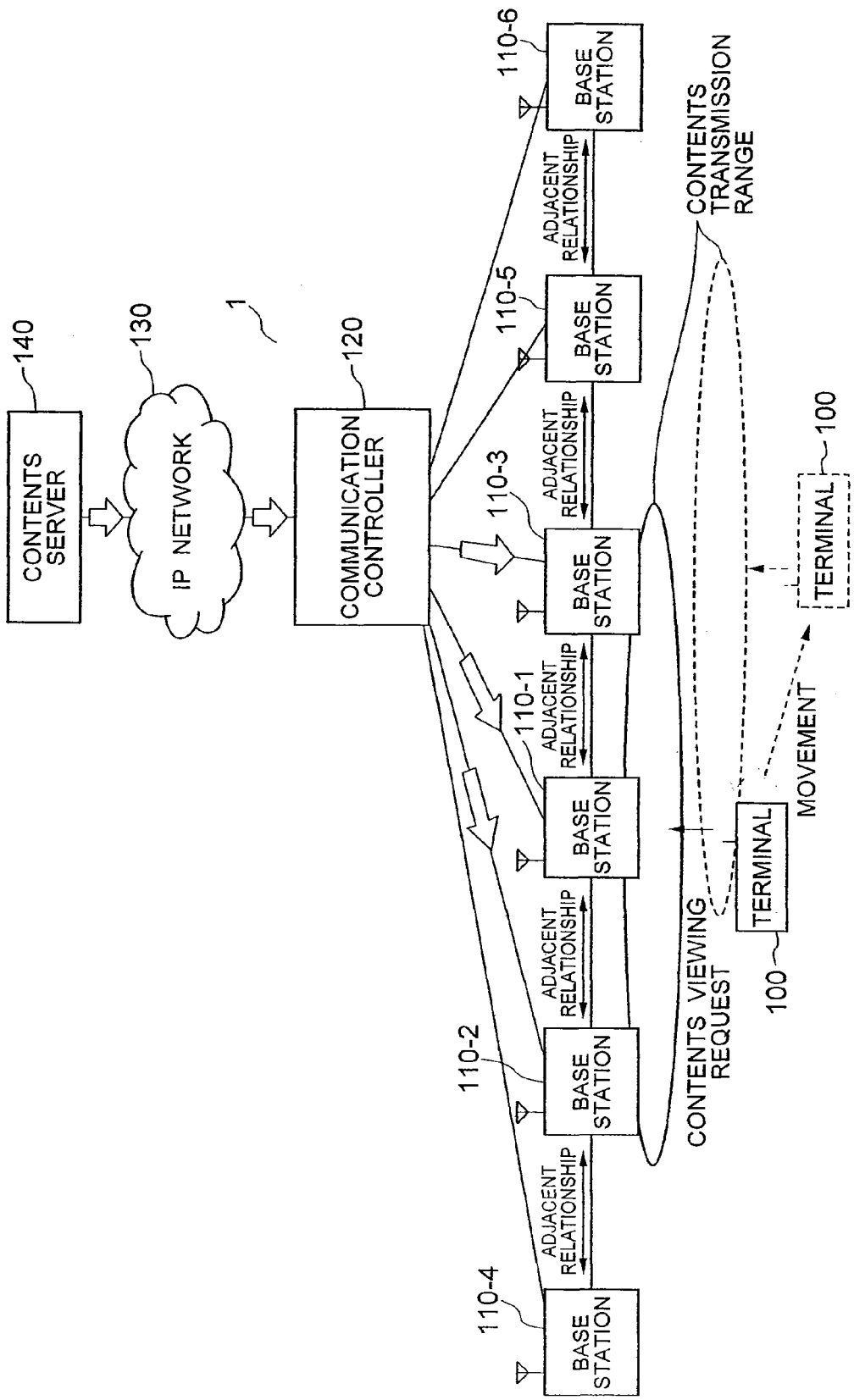
FIG. 1 is a diagram showing an overall configuration of a first embodiment of a radio communication system 1.

FIG. 1 shows an overall configuration of a first embodiment of a radio communication system 1. The system 1 includes an access terminal 100, a plurality of base stations 110-1 to 110-6, a communication controller (packet communication controller) 120 to control the base stations, a communication network such as an Internet Protocol (IP) network connected to the communication controller, and a contents server 140 connected to the IP network. In the radio communication system 1, communication information and control information are communicated in the form of packets. Although the system 1 includes only one access terminal 100 for convenience of description, a plurality of access terminals 100 are actually installed in the system 1.

Each base station includes a plurality of sectors. The base station 110-1 has an adjacent relationship with the base stations (sectors) 110-2 and 110-3. In the embodiment, an adjacent base station (sector) indicates a base station (sector) which is a target of handoff of the access terminal 100.

Each base station conducts radio communication with the access terminal 100. A flow (voice and sound as well as data) to be multicast is transmitted from the base station (sector) via a multicast channel to the access terminal. Each base station (sector) periodically notifies control information including information items such as transmission time and timing of a flow to the access terminal.

The communication controller 120 controls communication of a packet to be received and manages session information of the access terminal. The controller 120 also manages information such as the flow transmission time and timing of a flow sent from a plurality of base stations (sectors) at the same timing.

The contents server 140 manages a flow (contents) delivered to the access terminal.

Figure 2:
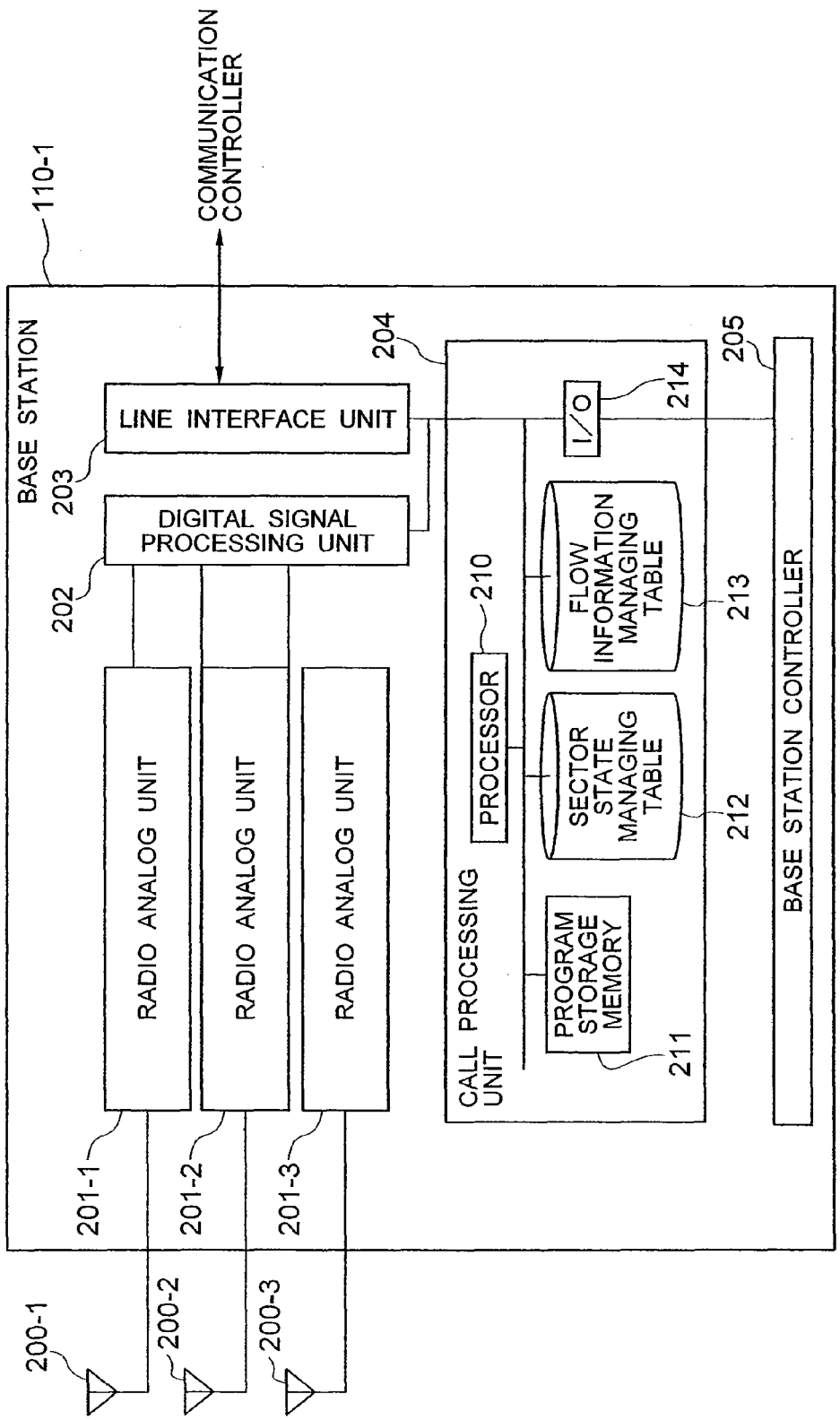
FIG. 2 is a block diagram showing a configuration of a base station.

FIG. 2 shows a configuration of the base station 110-1 in a block diagram. The other base stations 110-2 to 110-6 are configured also in a similar way. The base station 110-1 includes a plurality of antennas 200-1 to 200-3, radio analog units 201-1 to 201-3 respectively connected to the antennas 200-1 to 200-3, a digital signal processing unit 202 connected to the radio analog units 201-1 to 201-3, a line interface unit 203 connected to the communication controller 120, a call processing unit 204 connected to the digital signal processing unit 202 and the line interface unit 203, and a base station controller 205 connected to the call processing unit 204.

The analog units 201-1 and 203-3 convert analog signals received from the access terminal into digital signals and then output the signals to the digital signal processing unit 202. The units 201-1 and 203-1 also receive digital signals from the unit 202 to convert the signals into analog signals.

The digital signal processing unit 202 demodulates forward digital signals received from the radio analog units 201-1 to 201-3 and modulates reverse signals to be sent to the access terminal.

The line interface unit 203 communicates packets with the communication controller 120.

The call processing unit 202 includes a processor 210, a program storage memory 211 to store therein programs to be executed by the processor 210, a sector state managing table 212 to manage states of sectors, and a flow information managing table 213 to manage information of a flow to be sent to the access terminal 100, and an input/output (I/O) interface 214 to communicate signals with the line interface unit 203 and the base station controller 205.

The controller 205 controls operation of the base station 110-1 in a unified way.

Figure 3:
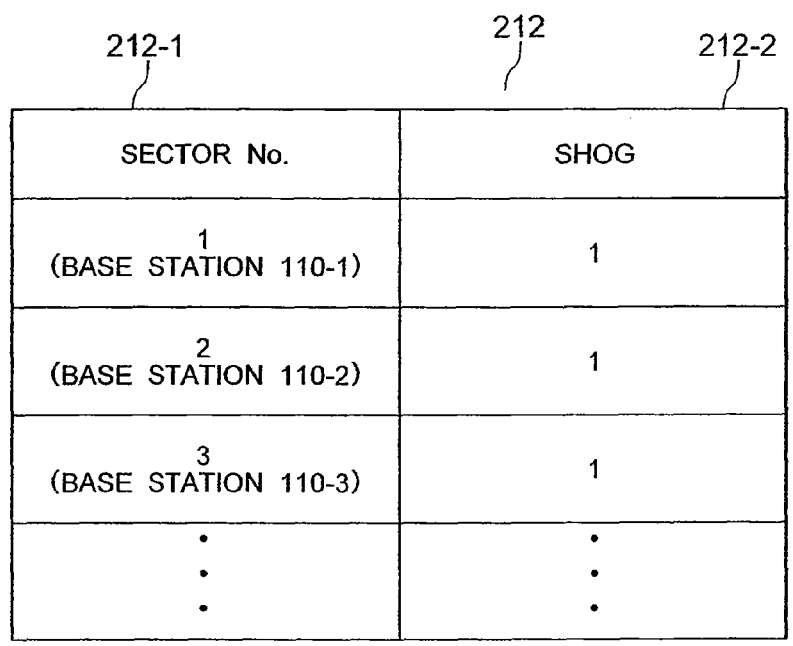
FIG. 3 is a diagram showing a layout of a sector state managing table 212 disposed in a base station.

FIG. 3 shows a layout of the sector state managing table 212 disposed in the base station. The table 212 stores entries each of which includes a sector number 212-1 to identify a sector and a Soft Handoff group (SHOG) including information to identify a group of sectors for which the same flow is transmitted at same timing, with a correspondence established therebetween.

Figure 4:
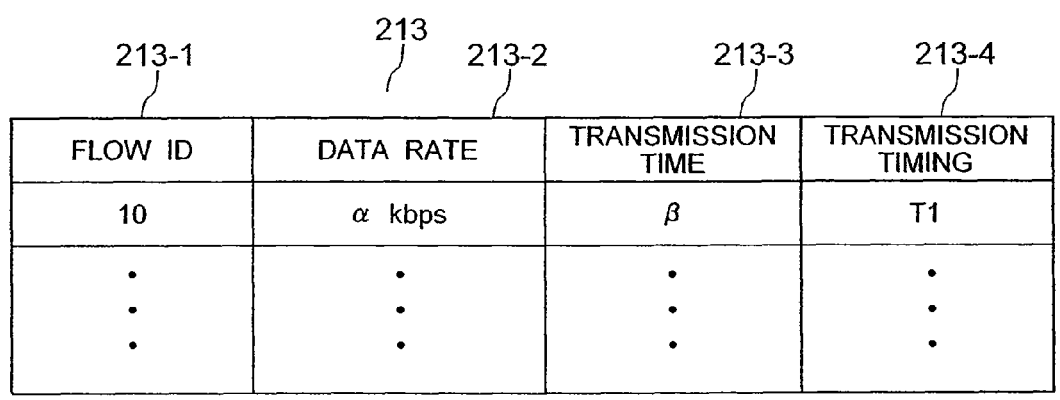
FIG. 4 is a diagram showing a layout of a flow information managing table 213 disposed in a base station.

FIG. 4 shows a layout of the flow information managing table 213 disposed in the base station. The table 213 stores entries each of which includes a flow ID 213-1 to identify a flow, a data rate 213-2 indicating a transmission data rate of the flow, transmission time 213-3 indicating time to transmit the flow, and transmission timing 213-4 to indicate timing to transmit the flow, with a correspondence established therebetween.

FIG. 5 shows a configuration of the communication controller 120. The controller 120 includes a base station interface unit 500 to be connected to a base station, an IP network interface unit 501 to be connected to the IP network 130, a call processing unit 503 connected to the interface units 500 and 501, and a device controller 502 connected to the call processing unit 503. Although the embodiment includes only one base station interface unit, the system may be configure to include a plurality of base station interface units according to the number of base stations disposed in the system.

The base station interface unit 500 communicates packets with base stations. The IP network interface unit 501 communicates packets with the IP network 130. The call processing unit 503 includes a processor 520, a program storage memory 521 to store programs to be executed by the processor 520, an information managing table 522 to store information necessary to achieve Soft Combine according to the present invention, and an input/output (I/O) interface 523 to communicate signals with the device controller 502. The controller 502 controls the communication controller 120 in a unified way.

FIG. 6 shows a layout of the information managing table 522 disposed in the communication controller. The table 522 stores entries each of which includes a flow ID 522-1 to identify a flow, a data rate 522-2 indicating a transmission data rate of the flow, transmission time 522-3 indicating transmission time of the flow, and transmission timing 522-4 indicating transmission timing of the flow, with a correspondence established therebetween.

FIG. 7 shows a configuration of the contents server 140 in a block diagram. The server 140 includes a processor 700, a program storage memory 701 to store programs to be executed by the processor 700, a contents storage database 702 to store flows (contents) to be delivered to the access terminal 100, and an input/output (I/O) interface 703 to be connected to the IP network 130.

Although not shown, the access terminal 100 includes a base station interface unit to communicate packets with base stations, a processor, a program storage memory to store programs to be executed by the processor, and a unit to combine a plurality of flows received from a plurality of base stations to restore the original data stream.

Figure 8:
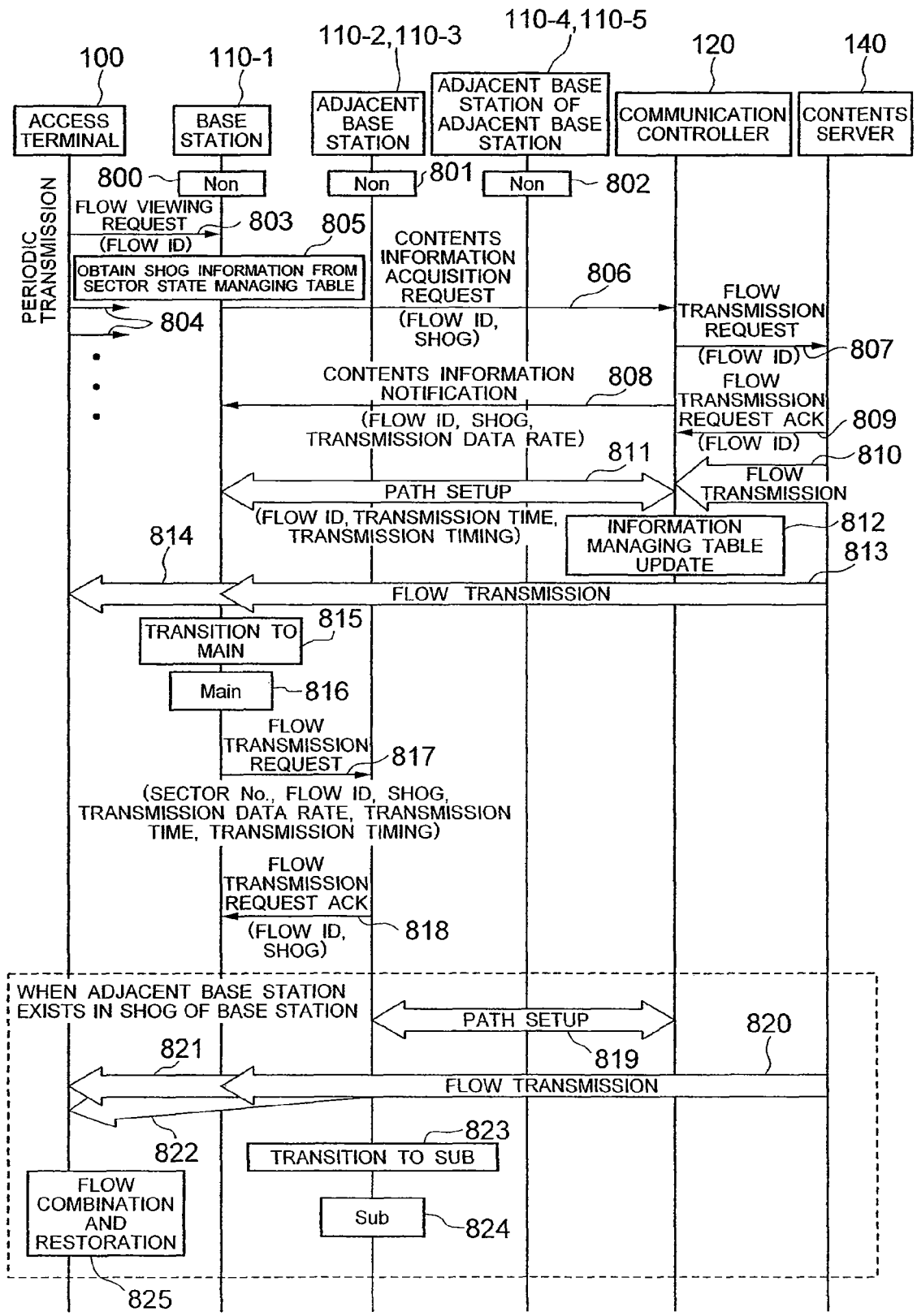
FIG. 8 is a sequence chart showing control operation of the radio communication system 1 to start flow transmission.

FIG. 8 shows, in a sequence chart, control of the radio communication system 1 to start flow transmission. Paying attention to the base station (sector) 110-1, the base station (sector) 110-2 is an adjacent base station (sector) of the base station (sector) 110-1, and the base stations (sectors) 110-4 and 110-5 are adjacent base stations (sectors) of the adjacent base stations (sectors) 110-2 and 110-3, respectively. In the embodiment, the base stations (sectors) 110-2 and 110-3 are referred to as adjacent base stations (sectors), and the base stations (sectors) 110-4 and 110-5 are referred to as adjacent base stations (sectors) of adjacent base stations (sectors).

The base station (sector) 110-1 having received a flow viewing request from the access terminal 100 is referred to as a base station in a "Main" state. The base stations (sectors) 110-2 and 110-3 having an adjacent relationship with the base station (sector) 110-1 having received a flow viewing request are referred to as base stations in a "Sub" state. The other base stations (sectors) 110-4 and 110-5 are referred to as base stations in a "Non" state.

According to the definitions, the initial state of each base station (sector) is "Non" (steps S800 to S802) in which the base station has not transmitted a flow to the access terminal 100. The terminal 100 sends a flow viewing request to the base station (sector) 110-1 (S803). The request is periodically sent thereto during a period of time in which of the owner of the access terminal is viewing the flow (S804).

When the flow viewing request is received from the access terminal 100, the base station sector) 110-1 makes retrieval through the sector state managing table 212 according to a sector number of the sector from which the request is received to thereby obtain information of an associated Soft Handoff group (SHOG; S805). The base station sector) 110-1 sends a flow information acquisition request including a flow ID of the requested flow indicated by the request and the SHOG to the communication controller 120 (S806).

Having received the request, the controller 120 sends a flow transmission request including information of the flow ID to the contents server 140 (S807). The controller 120 makes retrieval through the information managing table 522 according to the flow ID contained in the flow information acquisition request to obtain therefrom a transmission data rate 522-2 of the flow and then sends flow information including information of the transmission data rate 522-2 to the base station (sector) 110-1 (S808). In this operation, the controller 120 may send security information, not shown, together with the flow information to the base station (sector) 110-1.

When the flow transmission request is received, the contents server 140 returns an ACK signal to the transmission controller 120 (S809). The server 140 makes retrieval through the contents storage database 702 (FIG. 7) according to the flow ID contained in the request to obtain an associated flow and sends the flow to the controller 120 (S810).

Having received the flow information sent from the transmission controller 120, the base station (sector) 110-1 carries out a control operation to establish a path to the transmission controller 120 (S811). In the operation, the controller 120 sends information items of transmission time 522-3 and transmission timing 522-4 obtained from the information managing table 522 to the base station (sector) 110-1. For each flow, the controller 120 beforehand stores information of a physical data rate for radio communication between the access terminal and the base station and information of required throughput of an application in the access terminal in a storage device such as a database, not shown. Using the information, the controller 120 calculates the transmission time 522-3 and the transmission timing 522-4 for the flow. The controller 120 may transmit the transmission time 522-3 and the transmission timing 522-4 together with the contents information indicated in step S808 to the base station (sector) 110-1. After obtaining the transmission time 522-3 and the transmission timing 522-4, the transmission controller 120 stores these information items in the information managing table 522 to resultantly update the table 522 (S812). The base station (sector) 110-1 starts transmitting the flow delivered from the contents server 140 to the access terminal 100(S813, S814). The base station (sector) 110-1 controls the operation thereof such that the own state makes a transition from "Non" to "Main" after the transmission of the flow to the access terminal 100 (S815). As a result, the base station (sector) 110-1 enters the Main state (S816). The base station (sector) 110-1 then sends a flow transmission request including information items such as a flow ID, own sector number, SHOG, and the transmission data rate, transmission time, and transmission timing of the flow received from the communication controller 120 to the adjacent base stations (sectors) 110-2 and 110-3 (S817).

Having received the flow transmission request, each of the adjacent base stations (sectors) 110-2 and 110-3 returns an ACK signal to the base station (sector) 110-1 (S818). Thereafter, each adjacent base station (sector) compares the SHOG sent from the base station (sector) 110-1 with its own SHOG. If the SHOG is equal to each other, the base station (sector) conducts control to establish a path to the communication controller 120(S819). Next, each of the adjacent base stations (sectors) 110-2 and 110-3 starts transmitting the flow delivered from the contents server 140 to the access terminal 100 (S820, S821, S822). The base station (sector) then controls the operation thereof such that the own state makes a transition from "Non" to "Sub" after the transmission of the flow to the access terminal 100 (S823. As a result, each of the base stations (sectors) 110-2 and 110-3 enters the Sub state (S824). When flows are received from the base stations (sectors) 110-1 and 110-3, the access terminal 100 combines the flows with each other to restore the original data stream (S825). In this regard, if the SHOG of the access terminal 100 is different from the SHOGs of the adjacent base stations (sectors) 110-2 and 110-3, the processing of step S818 and subsequent steps is not executed. If the adjacent base station (110-2, 110-3) is in the Main state or is already in the Sub state when the flow transmission request is received from the base station (sector) 110-1, the present state is kept retained for the following reason. That is, the system is in a state in which a path has already been established between the adjacent base station (110-2, 110-3) and the communication controller 120 and the adjacent base station (110-2, 110-3) is transmitting the flow delivered from the contents server 140 to the access terminal 100.

Figure 9:
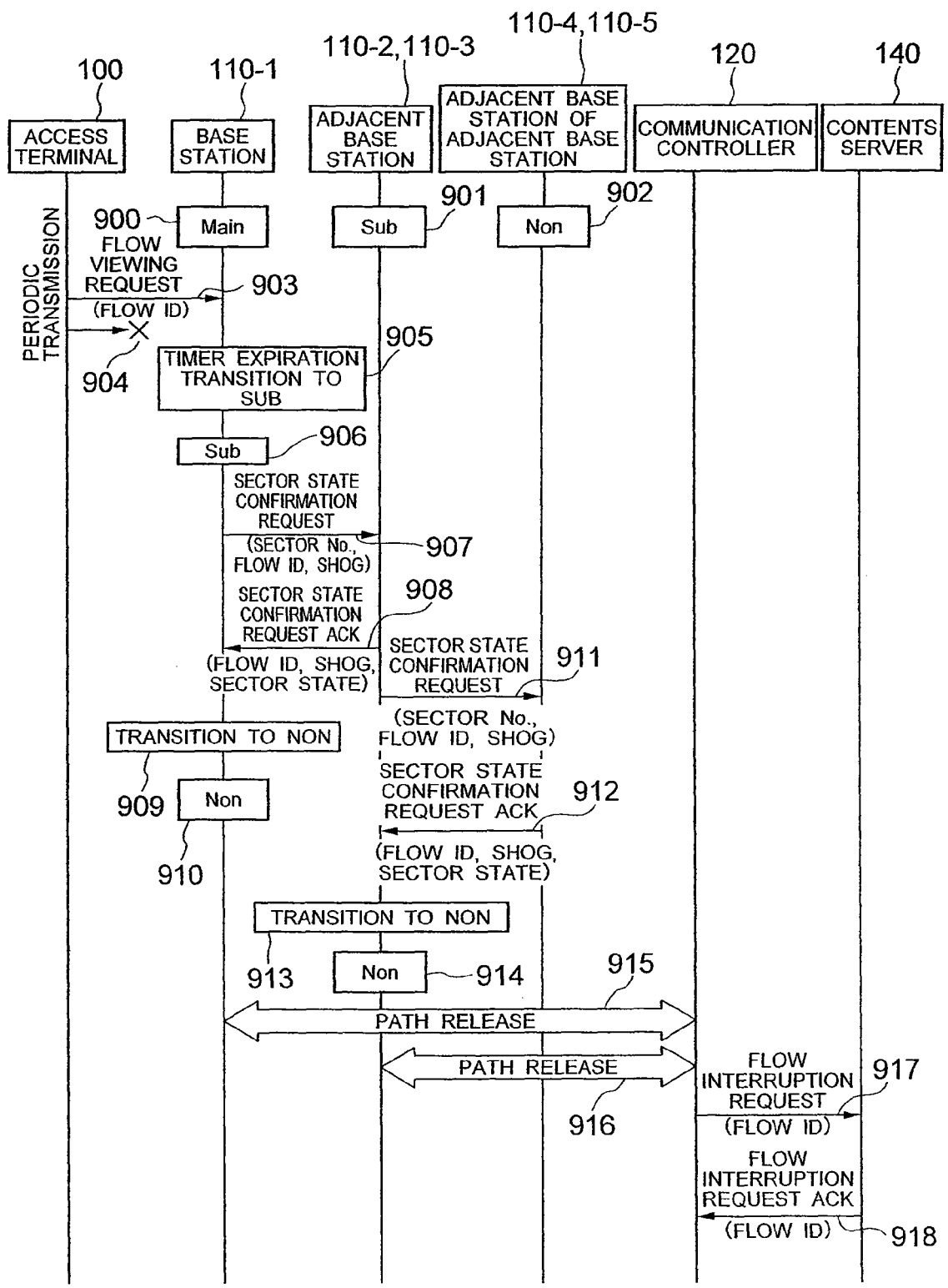
FIG. 9 is a sequence chart showing control operation of the radio communication system 1 to interrupt flow transmission.

FIG. 9 shows control operation of the radio communication system 1 to interrupt flow transmission in a sequence chart. Assume that the base station (sector) 110-1 is in the Main state, the adjacent base stations (sectors) 110-2 and 110-3 are in the Sub state, and the adjacent base stations (sectors) 110-4 and 110-5 of the adjacent base stations (sectors) are in the Non state (steps S900, S901, and S902).

The access terminal 100 periodically sends a flow viewing request including a flow ID to the base station (sector) 110-1 (S903). When the access terminal 100 interrupts the transmission of the flow viewing request to the base station (sector) 110-1 (S904), the base station (sector) 110-1 detects expiration of a flow view managing timer disposed therein and controls its own state to make a transition from "Main" to "Sub" (S905) to resultantly enter the Sub state (S906).

To confirm whether or not a sector in the Main state is present, the base station (sector) 110-1 sends a sector state confirmation request including information such as a sector number, a flow ID, and SHOG to the adjacent base stations (sectors) 110-2 and 110-3 (S907).

When the request is received, each of the adjacent base stations (sectors) 110-2 and 110-3 returns an ACK signal including information of a flow ID, SHOG thereof, and a sector state to the base station (sector) 110-1. Having received the ACK signal, the base station (sector) 110-1 recognizes that the sector state contained in the ACK signal is "Sub" and hence controls its own state to make a transition from "Sub" to "Non" (S909) to thereby enter the Non state (S910). If the sector state contained in the ACK signal is "Main", the base station (sector) 110-1 keeps the present state retained, i.e., "Sub".

Having received the sector state confirmation request from the base station (sector) 110-1 (S907), the adjacent base stations (sectors) 110-2 and 110-3 transfer the request to the adjacent base stations (sectors) 110-4 and 110-5 thereof, respectively (S911). The base stations (sectors) 110-4 and 110-5 return an ACK signal including information such as a flow ID, SHOG thereof, and a sector state to the base stations (sectors) 110-2 and 110-3, respectively (S912). Having received the ACK signal, the base stations (sectors) 110-2 and 110-3 recognize that the sector state contained in the ACK signal is "Non" and hence control the respective states to make a transition from "Sub" to "Non" (S913) to thereby enter the Non state (S914). If the sector state contained in the ACK signal is "Main", the base stations (sectors) 110-2 and 110-3 keep the present state retained, i.e., "Sub".

As indicated in step S910, when the own state is set to "Non", the base station (sector) 110-1 releases the path to the communication controller 120 (S915). The base stations (sectors) 110-2 and 110-3 also release the paths to the controller 120 when the states thereof are set to "Non" (S916).

When it is recognized that the paths to all base stations (sectors) under control of the communication controller 120 are released, the controller 120 sends a flow interruption request including a flow ID to the contents server 140 (S917).

Having received the request, the contents server 140 returns an ACK signal to the communication controller 120 (S918).

As above, according to the first embodiment, the base stations (sectors) to communicate with the access terminal 100 are limited to the base station (sector) having received a flow viewing request from the access terminal 100 and the adjacent base stations (sectors) adjacent to the base station (sector) having received the request. Therefore, the access terminal 100 receives flows from base stations (sectors) of which the number is within performance of the access terminal 100. The access terminal 100 does not receive flows from a base station of which the received power is weak. Therefore, it is possible to suppress useless flow transmission. In a base station (sector) not required to send a flow, a period of time not used for flow transmission can be assigned to, for example, a unicast service for transmission of voice and sound as wells as data. Therefore, the radio resources can be efficiently used.

2. Second Embodiment

FIGS. 10 and 11 show an outline of operation in a second embodiment of a radio communication system. Soft Combine Radius (SCR) indicated in FIGS. 10 and 11 is a parameter stipulating a range in which the operation of Soft Combine is not required. FIG. 10 shows a state in which a base station (sector) 1002 is additionally disposed as a communication target of the access terminal 100. When the access terminal 100 moves to a position outside the SCR, the terminal 100 sends a flow addition request to the base station (sector) 1001. Having received the request, the base station (sector) 1001 sends a flow transmission request to the base station (sector) 1002. The access terminal 100 then receives flows from the base stations (sectors) 1001 and 1002 and combines the flows with each other to restore the original data stream. FIG. 11 shows a situation in which the base station (sector) 1002 is deleted from the communication targets of the access terminal 100. When the access terminal 100 moves to a position in the SCR, the terminal 100 sends a flow deletion request to the base station (sector) 1001. Having received the request, the base station (sector) 1001 sends a flow interruption request to the base station (sector) 1002. The access terminal 100 then receives a flow only from the base station (sector) 1001. FIG. 12 shows a configuration of the table 1200 disposed in each of the base stations 1001 and 1002. The table 1200 stores entries each of which includes a sector number 1201 and a Soft Combine Radius (SCR) 1202 with a correspondence established therebetween.

Figure 13:
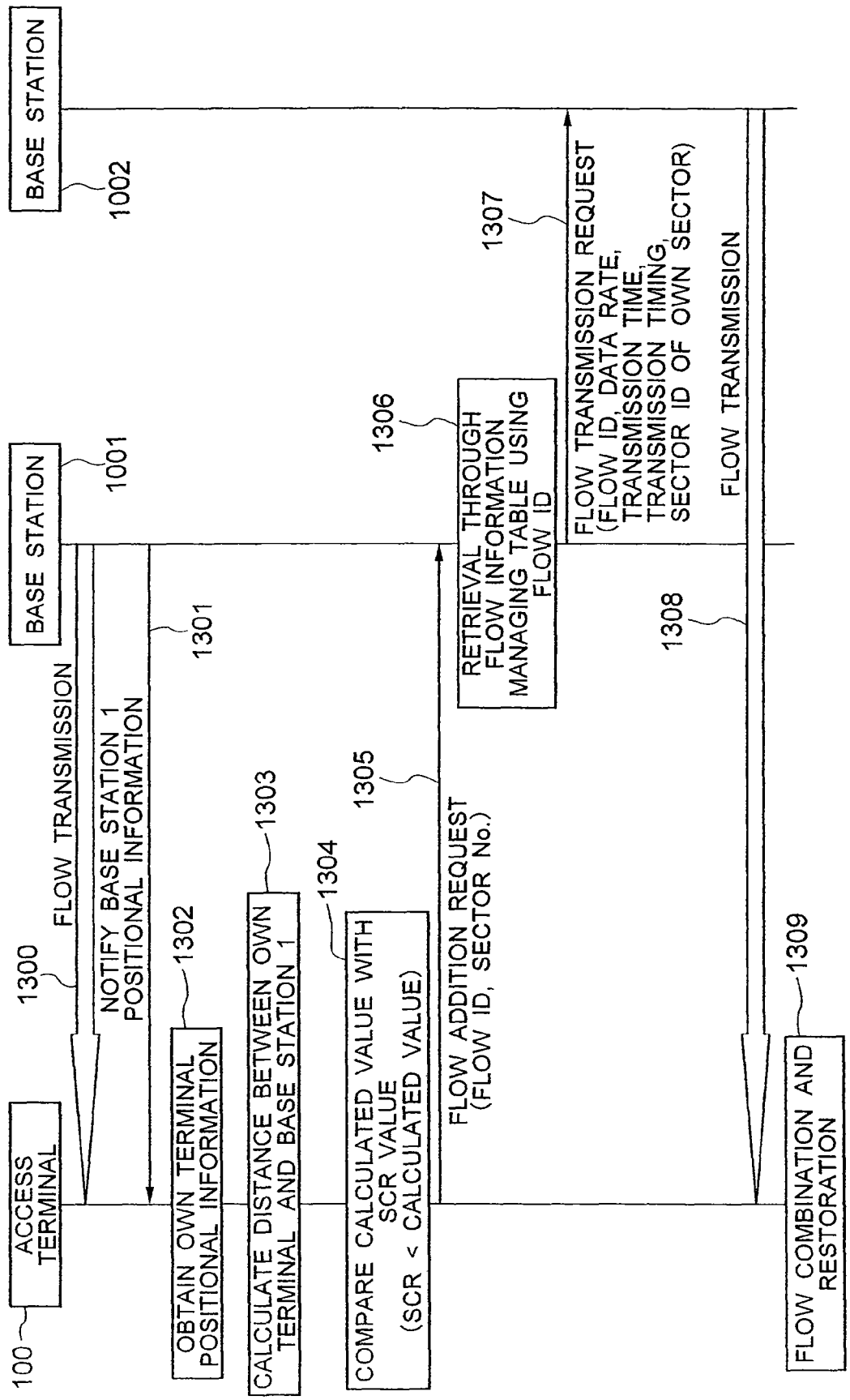
FIG. 13 is a sequence chart showing operation of the radio communication system when a base station 1002 is added as a communication target of an access terminal 100.

FIG. 13 shows operation of the radio communication system in a sequence chart in which the base station (sector) 1002 is added to the communication targets of an access terminal 100.

In FIG. 13, the access terminal 100 is in a zone of the base station (sector) 1002 and communicates signaling information with the base station (sector) 1001.

The base station (sector) 1001 transmits a flow to the access terminal 100 (step S1300). The base station (sector) 1001 also notifies a positional information thereof and information of SCR stored in the table 1200 to the access terminal 100 (S1301).

The terminal 100 obtains positional information thereof using, for example, a global positioning system (GPS; S1302). Next, using the own positional information and the positional information notified from the base station 1001, the terminal 100 obtains distance between the terminal 100 and the base station 1001 (S1303). After the access terminal 100 moves to a position, when it is recognized that the access terminal 100 is outside the SCR, the terminal 100 compares the SCR value with the calculated value obtained in step S1303 (S1304). If the SCR value is less than the calculated value (SCR value<calculated value) as a result of the comparison, the access terminal 100 sends a flow addition request including a flow ID and a sector number of a base station (sector) requested for flow transmission, e.g., the base station (sector) 1002 to the base station (sector) 1001 (S1305). When the flow addition request is to be sent to a plurality of base stations (sectors), it is also possible that the access terminal 100 selects n base station which are n higher base stations with respect to received power and which are in sectors other than the base station (sector) 1001. The terminal 100 then sends the flow addition request to the selected base stations (sectors). In step S1305, when the flow addition request is to be sent to a plurality of base stations (sectors), it is also possible that the access terminal 100 selects n nearer base stations with respect to the distance to the terminal 100.

When the flow addition request is received from the access terminal 100 (S1305), the base station (sector) 1001 makes retrieval through the flow information managing table 213 (FIG. 4) according to the flow ID contained in the request (S1306) and sends, to the base station (sector) 1002, a flow ID, a data rate, transmission time, and transmission timing associated with the flow ID and a sector number of the base station (sector) 1001 (S1307).

Having received the request from the base station (sector) 1001, the base station (sector) 1002 starts flow transmission (S1308).

The access terminal 100 receives flows sent respectively from the base stations (sectors) 1001 and 1002 (S1300, S1308) and combines the flows with each other to restore the original data steam (S1309).

Figure 14:
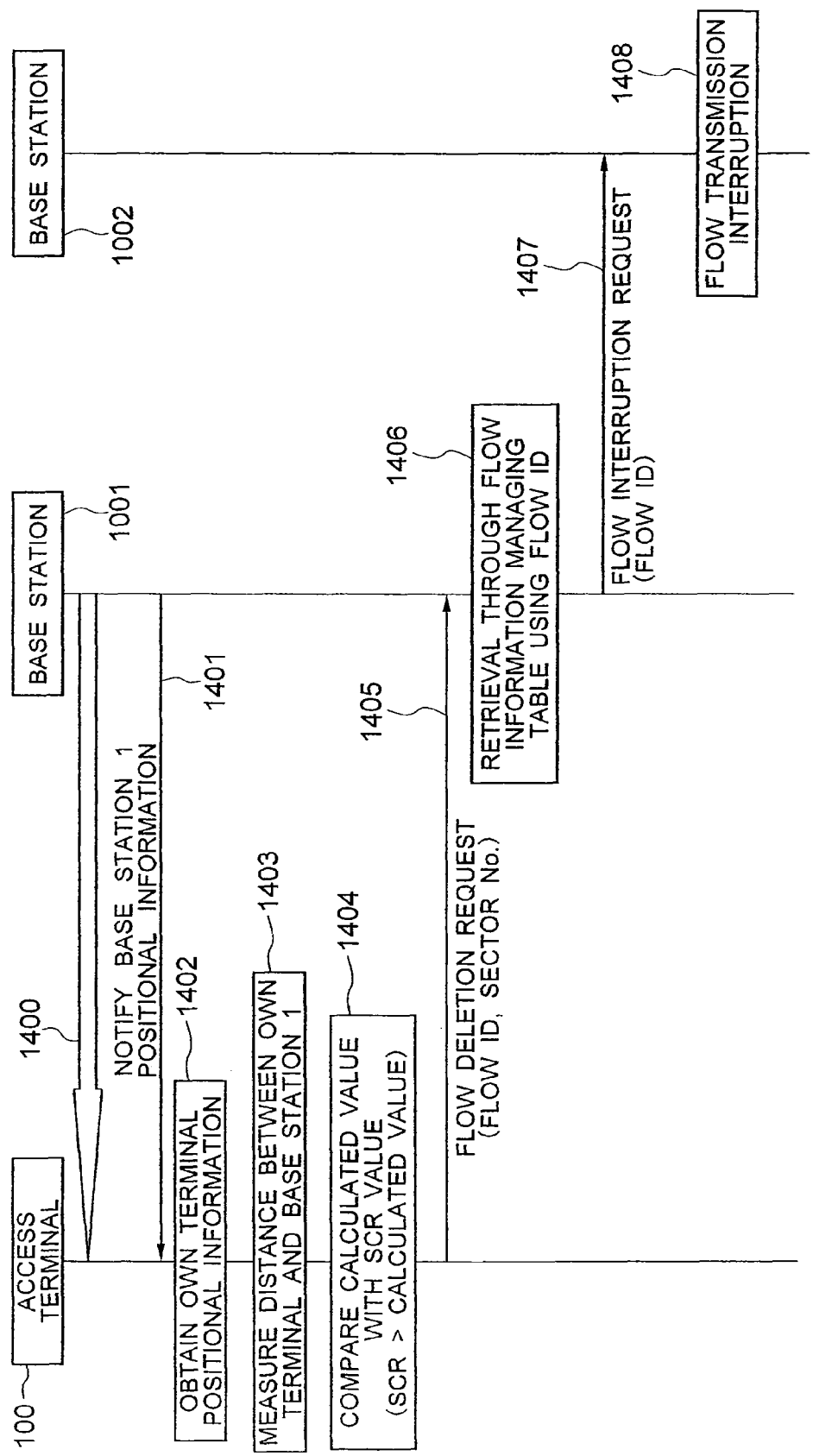
FIG. 14 is a sequence chart showing operation of the radio communication system when the base station 1002 is removed from the communication targets of an access terminal 100.

FIG. 14 shows, in a sequence chart, operation of the radio communication system when the base station (sector) 1002 is removed from the communication targets of an access terminal 100. In FIG. 14, a sequence from S1400 to S1403 is substantially equal to a sequence from S1300 to S1303 shown in FIG. 13.

After the access terminal 100 moves to a position, when it is recognized that the access terminal 100 is in the SCR, the terminal 100 compares the SCR value with the calculated value (S1404). If the SCR value is more than the calculated value (SCR value>calculated value) as a result of the comparison, the access terminal 100 sends a flow deletion request including a flow ID and a sector number of a base station (sector) requested for flow transmission interruption, e.g., the base station (sector) 1002 to the base station 1001 (S1405).

When the flow deletion request is received from the access terminal 100, the base station (sector) 1001 makes retrieval through the flow information managing table 213 (FIG. 4) according to the flow ID contained in the request (S1406) to send information such as an associated flow ID and a sector number of the base station (sector) 1001 to the base station (sector) 1002 (S1407).

Having received the request, the base station (sector) 1002 makes a check to confirm whether or not a flow viewing request has been received from any access terminal other than the access terminal 100 for the flow. If such a flow viewing request has not been received, the base station (sector) 1002 interrupts the flow transmission (S1408).

To prevent addition and deletion of a flow from being repeatedly conducted at an interval of quite a short period of time, it is possible to provide a predetermined protection period of time before a flow deletion request is transmitted. It is also possible that by defining another SCR for a flow interruption request in addition to the SCR for a flow transmission request such that the flow interruption processing is executed using a conditional expression of "SCR for flow transmission>SCR for flow interruption".

For a flow viewing request periodically sent from access terminals, a timer for flow interruption may be disposed in the base station (sector). Using the timer, the base station interrupts the flow transmission.

3. Third Embodiment

Figures 15, 16:
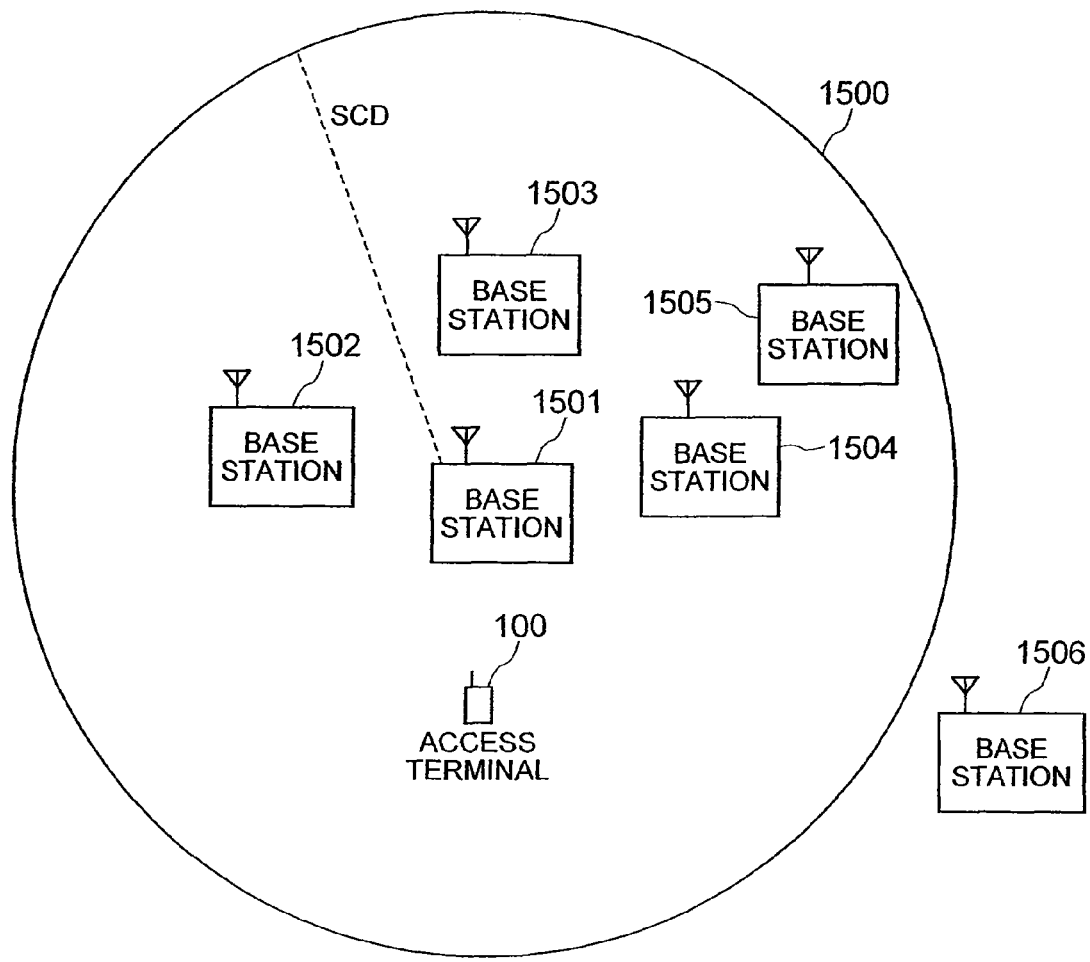
FIG. 15 is a diagram showing a configuration of a third embodiment of the radio communication system.
FIG. 16 is a diagram showing a layout of a table 1600 disposed in the third embodiment of the communication controller station.

FIG. 15 shows a configuration of a third embodiment of the radio communication system. In FIG. 15, Soft Combine Distance (SCD) is a parameter stipulating a range in which a base station (sector) sends a flow transmission request to an adjacent base station (sector). A base station (sector) 1501 with which the access terminal 100 is communicating signaling information transmits a flow transmission request to adjacent base stations (sectors) 1502 and 1503. Since the base station (sector) 1505 is an adjacent base station (sector) of the base station (sector) 1504, the base station (sector) 1504 sends a flow transmission request to the base station (sector) 1505. The operation will be described later in detail.

FIG. 16 shows a layout of the table 1600 disposed in a base station. The table 1600 stores entries each of which includes a sector number 1601, an SCD 1602, positional information 1603, and power information 1604 with a correspondence established therebetween.

Figure 17:
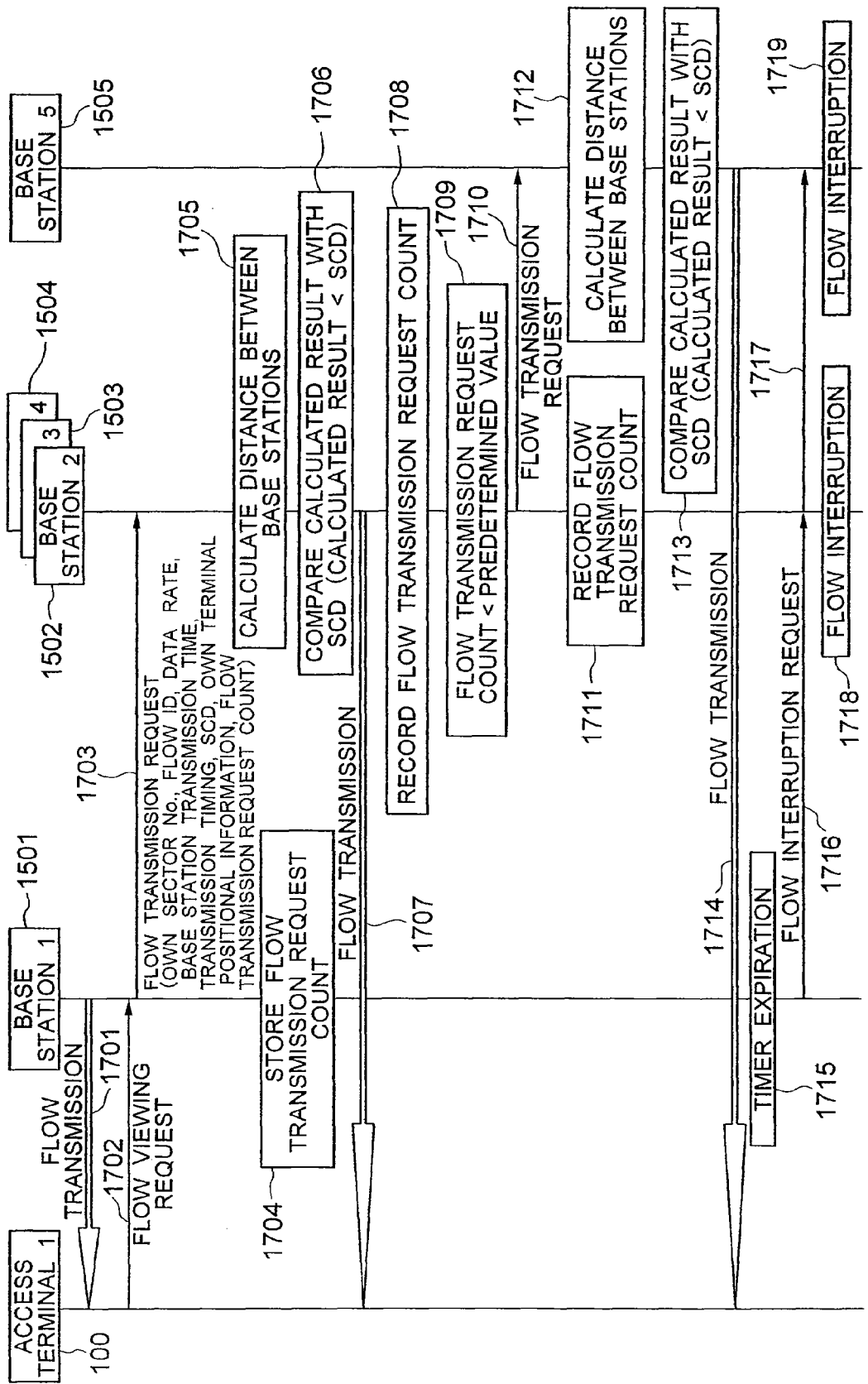
FIG. 17 is a sequence chart showing operation of the third embodiment of the radio communication system.

FIG. 17 shows, in a sequence chart, operation of the third embodiment of the radio communication system. The base station (sector) 1501 is transmitting a flow to the access terminal 100 (step S1701). When a flow viewing request is received from the access terminal 100 (S1702), the base station (sector) 1501 sends a flow transmission request including information such as its own sector ID, a flow ID, transmission time, transmission timing, SCD, positional information thereof, and a flow transmission request count to the adjacent base stations (sectors) 1502 and 1504 (S1703). The flow transmission request count is used by the base stations (sectors) to determine whether or not the flow transmission is to be conducted. The base station (sector) 1501 stores the count in, for example, a memory, not shown (S1704). The flow transmission request count is used by each of the base stations (sectors) to determine whether or not the flow transmission is to be conducted. The flow transmission request count is used by each base station (sector) to determine whether or not the flow transmission is to be conducted. For example, when a flow transmission request is received from the base station (sector) 1501, the base station (sector) 1502 sends the flow transmission request to an adjacent base station thereof, i.e., the base station (sector) 1503. Similarly, when the flow transmission request is received from the base station (sector) 1502, the base station (sector) 1503 sends the flow transmission request to an adjacent base station thereof, i.e., the base station (sector) 1501. This forms a loop including the base stations (sectors) 1501, 1502, and 1503. To prevent this event, the flow transmission request count is used.

Having received the request (S1703), each of the base stations (sectors) 1502 to 1504 calculates distance between the base station 1501 and the own base station (S1705). Next, the base station (sector; 1502 to 1504) compares the calculated result with the SCD value stored in the table 1600 (S1706). If the SCD value is more than the calculated value (SCD>calculated value) as a result of the comparison and it is recognized that the pertinent base station is not transmitting the flow (S1706), the base station starts transmitting the flow to the access terminal 100 (S1707). Each base station (sector; 1502 to 1504) also stores the flow transmission count in, for example, a memory, not shown (S1708). In step S1706, each of the base stations (sectors) 1502 to 1504 keeps the transmission state of the flow if the SCD value is equal to or less than the calculated value (SCD≦calculated value) as a result of the comparison and it is recognized that the base station is not transmitting the flow.

Next, each of the base stations (sectors) 1502 to 1504 compares the flow transmission count with a predetermined value (S1709). If the count is less than the predetermined value, the base station (sector) sends a flow transmission request to the base station (sector) 1505 other than those having received the flow transmission request. The base station (sector; 1502 to 1504) updates the flow transmission request count stored in the memory (S1711). That is, the base station (sector) having received the flow transmission request adds one to the received transmission request count to update the count if a predetermined period of time has already lapsed after the last transmission of a flow transmission request for the flow. The base station (sector) then transmits the updated transmission request count together with the flow transmission request to the adjacent base station (sector) other than those having received the flow transmission request.

In step S1709, if the flow transmission request count is more than the predetermined value, each of the base stations (sectors) 1502 to 1504 does not transmit any flow transmission request message.

The base station (sector) 1505 executes processing similar to the processing of steps S1705 and S1706 (S1712 and S1713) to transmit a flow to the access terminal 100 (S1714).

The base station (sector) 1501 sets a time limit to a timer for the flow viewing request periodically sent from the access terminal 100 to control the request. When the time limit thus set to the timer expires (S1715), the base station (sector) 1501 sends a flow interruption request including a flow ID for transmission interruption and a message transmission request count to the adjacent radio base stations (sectors) 1502 to 1504 (S1716). Having received the request from the base station 1501, the base stations 1502 to 1504 transfer the request to the base station 1505 (S1717).

The base stations (sectors) 1502 to 1505 interrupt, if a flow viewing request has not been received from other access terminals, the flow transmission for the flow (S1718, S1719). If a value obtained by adding one to the message transmission request count contained in the flow interruption request is equal to or less than a predetermined value, the base stations (sectors) 1502 to 1505 transmit a flow interruption request to the adjacent base stations (sectors) other than those having received the flow interruption request.

If the SCD value is changed according to the increase in the number of access terminals in FIG. 15, operation similar to that shown in FIG. 17 is conducted using the SCD changed as above. The SCD value is changed as below. For example, when a small number of access terminals are viewing multicast data, the SCD is set to a small value (SCD1). When the number of such access terminals is increasing, the SCD is set to a value (SCD2) larger than SCD1. When the number becomes greater, the SCD is set to a value large than SCD2.

4. Fourth Embodiment

Figure 18:
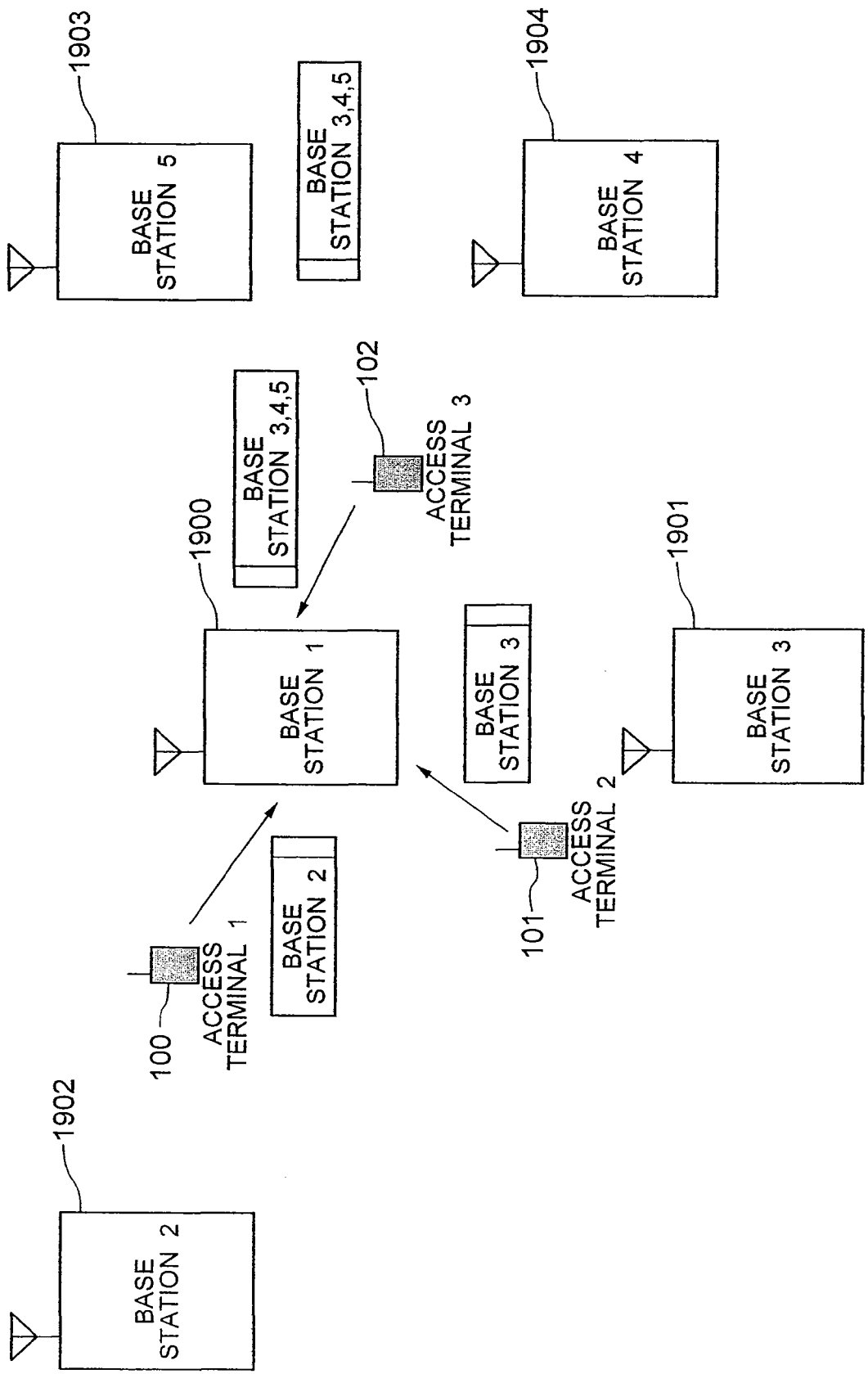
FIG. 18 is a diagram showing an outline of operation in a fourth embodiment of the radio communication system.
Figure 19:
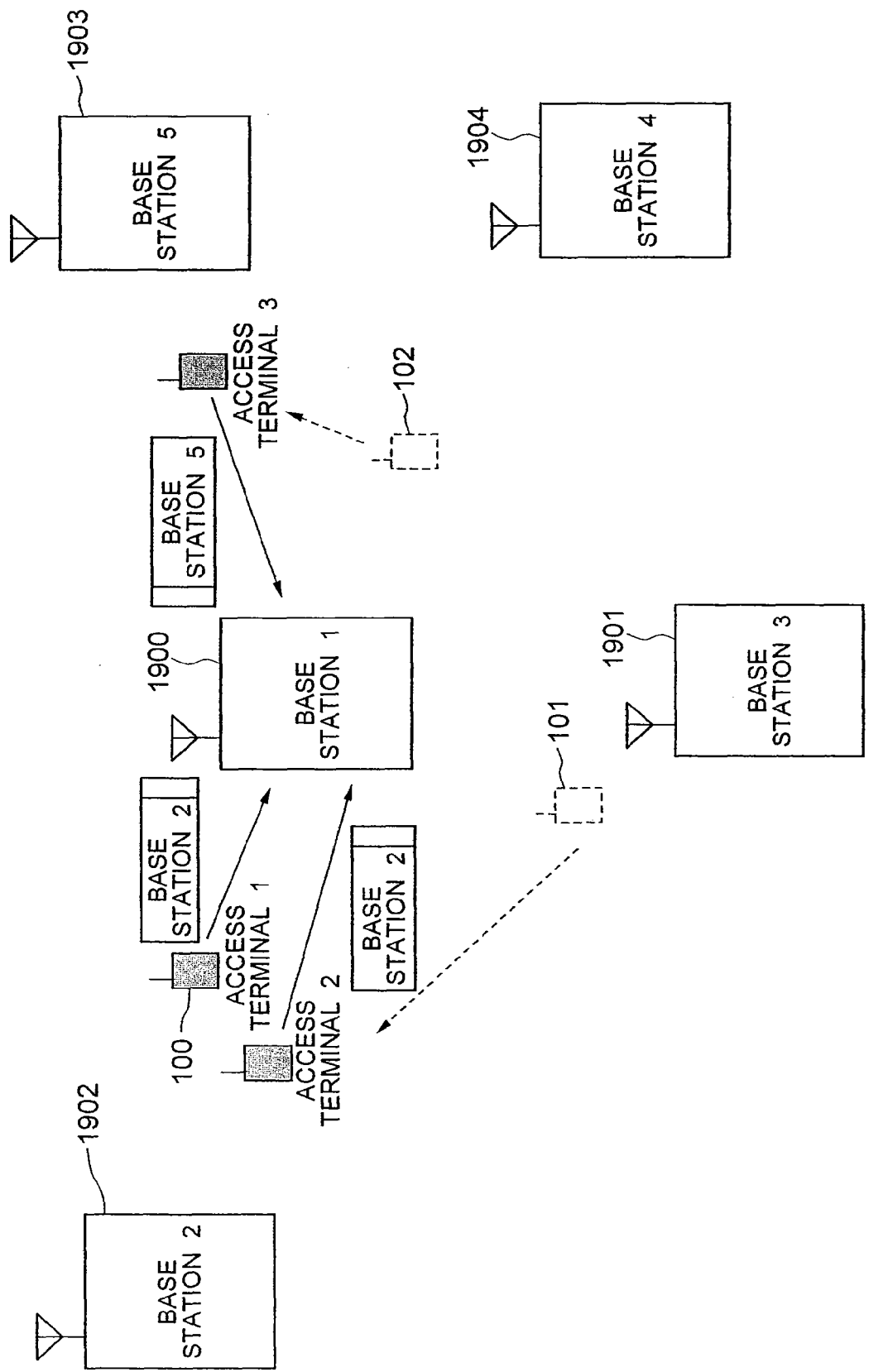
FIG. 19 is a diagram also showing an outline of operation in a fourth embodiment of the radio communication system.
Figure 22:
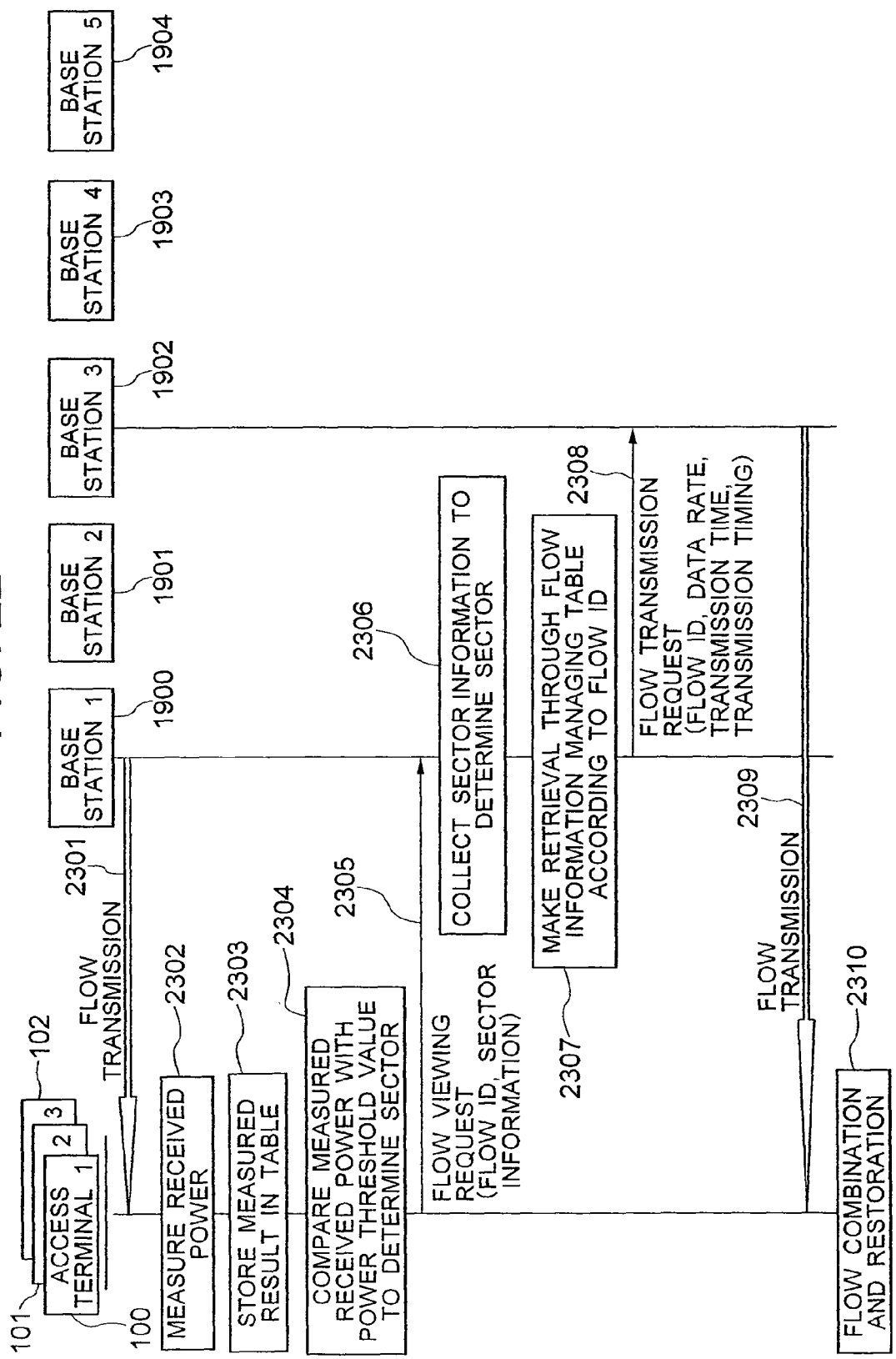
FIG. 22 is a sequence chart showing operation of the fourth embodiment of the radio communication system.
Figure 23:
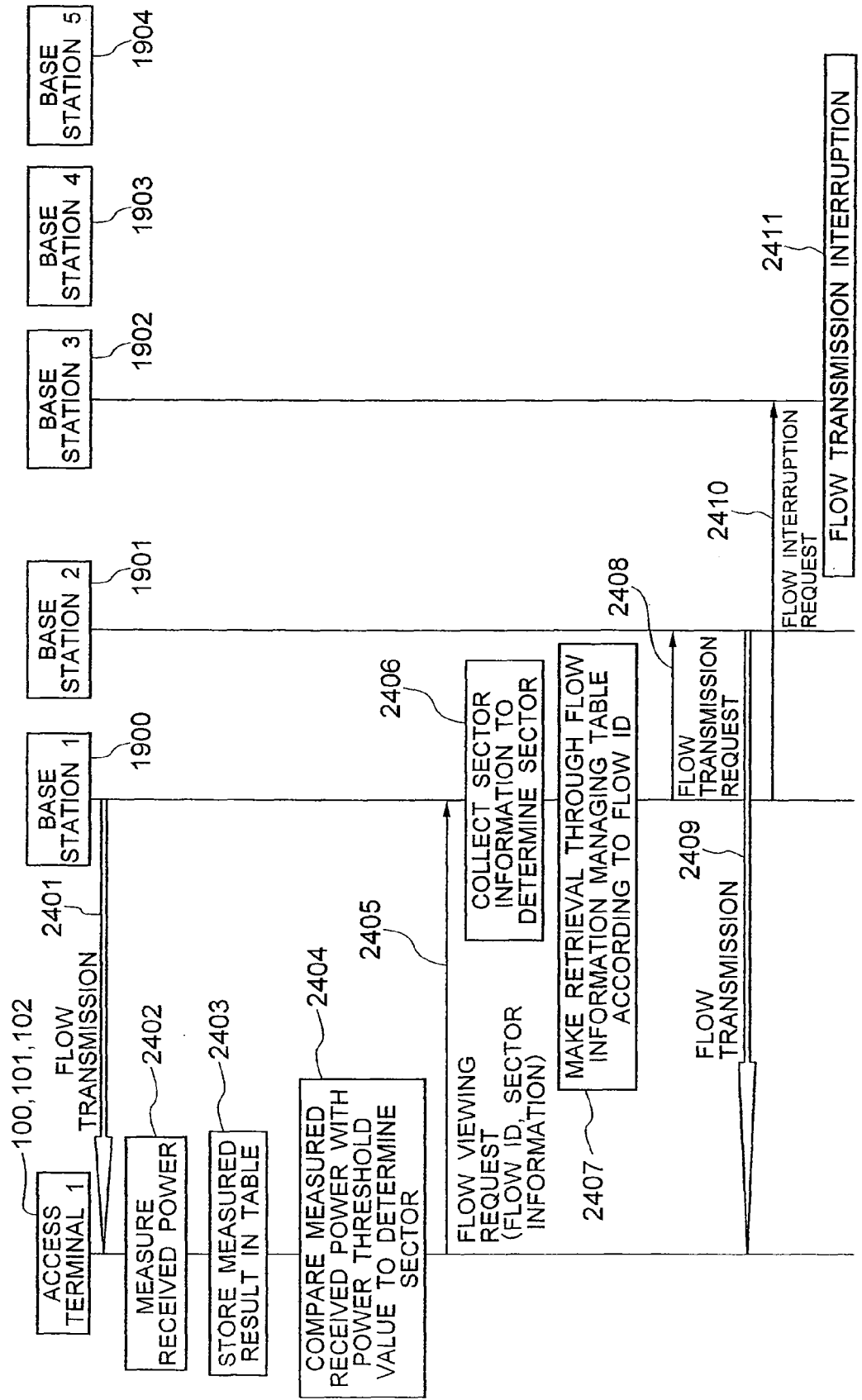
FIG. 23 is a sequence chart also showing operation of the radio communication system when access terminals 101 and 102 move to other positions.

FIGS. 18 and 19 show an outline of operation in a fourth embodiment of the radio communication system. FIG. 20 shows a layout of a table 2100 disposed in each access terminal. FIG. 21 shows a layout of a table 2200 disposed in each base station. FIG. 23 shows, in a sequence chart, operation in the fourth embodiment of the radio communication system.

The access terminals 100, 101, and 102 are in the zone of a base station (sector) 1900 and communicate signaling information therewith. The base station 1900 is transmitting flows to the access terminals 100 to 102 (step S2301).

When a signal is received from each base station (sector), each of the access terminals 100 to 102 measures power of the signal (step S2302) and stores the measured value of signal power in the table 2100 (step S2303). Each access terminal (100, 101, 102) compares the measured power value with a predetermined power threshold value to determine n base stations (sectors) (n=1, 2, . . . ) in descending order of the received power, each of the n base stations having a measured power value more than the predetermined power threshold value (S2304). In the embodiment, the value of n is set to a value within a range determined in consideration of performance of the access terminals. That is, if the values are within the range, the access terminals can combine received power values with each other.

Next, each of the access terminals 100 to 102 sends a flow viewing request including information of the base stations (sectors) determined in step S2304 to the base station (sector) 1900 (S2305). In the embodiment, since the received power from the base station (sector) 1901 has a high value, the access terminal 100 transmits a flow viewing request including information of the base station (sector) 1901 to the base station (sector) 1900. Similarly, the access terminal 101 transmits a flow viewing request including information of the base station (sector) 1902 to the base station (sector) 1900, and the access terminal 102 transmits a flow viewing request including information of the base stations (sectors) 1902 to 1904 to the base station (sector) 1900.

Figure 24:
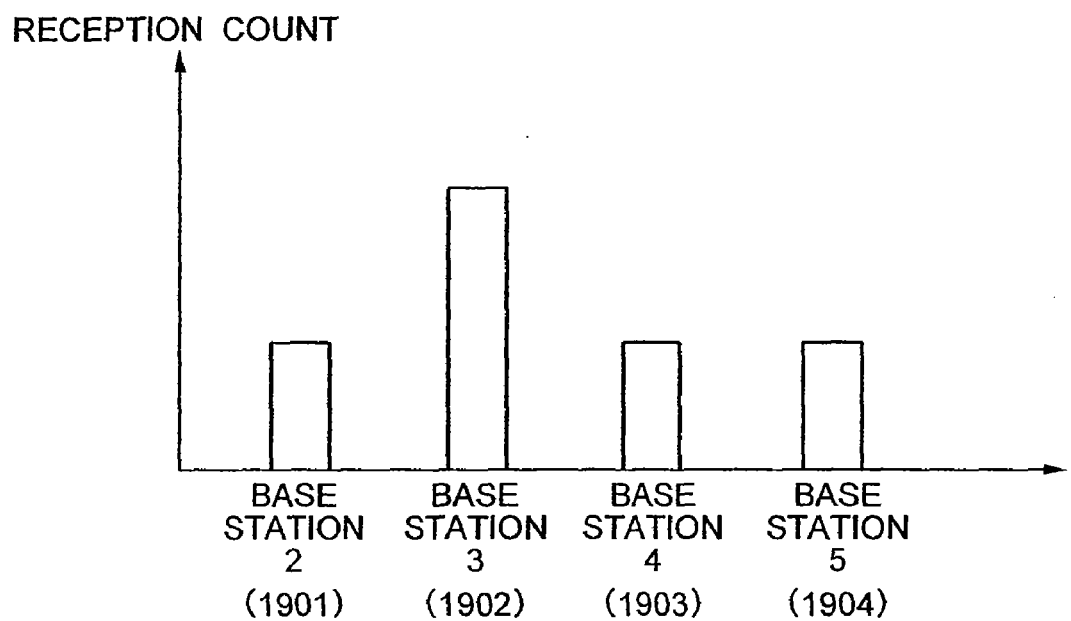
FIG. 24 is a graph showing results of static information collected by a base station.

The base station (sector) 1900 collects information of a sector contained in the request from each access terminal to determine m high-order sectors (m=1, 2, . . . ) to which a flow transmission request is to be transmitted (S2306). In the embodiment, as can be seen from FIG. 24, the base station (sector) 1900 determines the base station (sector) 1902 as a base station (sector) for the flow transmission request. The base station (sector) 1900 then makes retrieval through the flow information managing table according to a flow ID to send a flow transmission request including a flow ID, a data rate, transmission time, and transmission timing associated with the flow ID used in the retrieval to the base station (sector) 1902 (S2308). When the request is received therefrom, the base station (sector) 1902 transmits a flow to each of the access terminals 100 to 102 (S2309).

The access terminal 100 receives flows sent from the base stations (sectors) 1900 and 1902 (S2301, S2309) and combines the flows with each other to restore the original data stream (S2310).

FIG. 23 shows, in a sequence chart, operation of the radio communication system when the access terminals 101 and 102 move to other positions as shown in FIG. 19. The base station 1900 is transmitting a flow to the access terminals 100 to 102 (step S2401).

Each of the access terminals 100 to 102 measures power of a signal received from each base station (sector; step S2402) to store a measured value of the power in the table 2100 (step S2403; FIG. 20). Thereafter, each of the access terminals 100 to 102 compares the measured power value with a predetermined power threshold value. The terminal (100, 101, 102) resultantly determines n high-order base stations (sectors) with respect to the received power (n=1, 2, . . . ), each of the n high-order base stations having a measured power value more than the predetermined power threshold value (S2404). Next, each of the access terminals 100 to 102 sends a flow viewing request including information of the sectors determined in step S2404 to the base station (sector) 1900 (S2405). In the embodiment, the access terminal 101 sends, according to the movement thereof, a flow viewing request including information of the base station (sector) 1902 to the base station 1900. Similarly, the access terminal 102 transmits, according to the movement thereof, a flow viewing request including information of the base station (sector) 1903 to the base station (sector) 1900.

Figure 25:
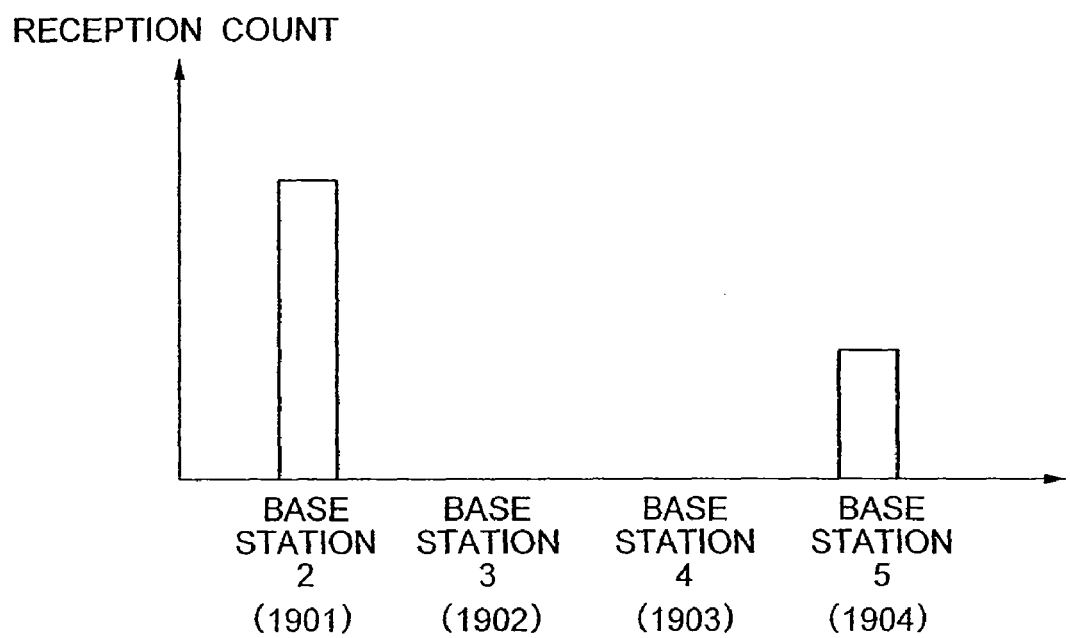
FIG. 25 is a graph also showing results of static information collected by the base station.

The base station (sector) 1900 collects information of sectors contained in the flow viewing requests received from the access terminals 100 to 102 and determines m high-order sectors (m=1, 2, . . . ) to which a flow transmission request is to be transmitted (S2406). As shown in FIG. 25, the base station (sector) 1900 determines the base station (sector) 1901 as a base station (sector) for the flow transmission request. Next, the base station (sector) 1900 makes retrieval through the flow information managing table according to a flow ID to send a flow transmission request including a flow ID, a data rate, transmission time, and transmission timing associated with the flow ID used in the retrieval to the base station (sector) 1901 (S2408). Thereafter, the base station (sector) 1901 transmits a flow to each of the access terminals 100 to 102 (S2409). The base station (sector) 1900 sends a flow interruption request to the base station (sector) 1902 (S2410). When the request is received from the base station (sector) 1900, the base station (sector) 1902 interrupts transmission of flows to the access terminals 100 to 102 (S2411).

According to the first to fourth embodiments described above, there can be provided a radio communication system and a base station. Using the system and the base station, it is possible, in a radio communication system in which a wave propagation environment varies, to dynamically determine base stations (sectors) to be communicated with an access terminal to efficiently conduct "Soft Combine".

Also, unnecessary use of radio bands can be prevented and the radio resources can be efficiently used.

Although the base stations carry out the control operation of flow transmission and interruption of the flow transmission in the first to fourth embodiments, it is also possible that the communication controller conducts the control operation.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radio communication system including:
a plurality of base stations;
a communication controller connecting the plurality of base stations with a communication network; and
a content server connected to the communication network, wherein the plurality of base stations transmit same communication information to an access terminal at a same timing and the access terminal combines the communication information received from the plurality of base stations at the same timing,
wherein each of the base stations includes a plurality of sectors,
wherein a group of the sectors which transmit the same communication information at the same timing is determined and a group number is defined to identify the group,
wherein each of the base stations includes a sector state managing table for storing a sector number for identifying a corresponding sector and the group number for identifying the group of the sectors which transmit the same communication information at the same timing,
wherein, when a first base station receives a viewing request from an access terminal, the first base station establishes a path to the communication controller, obtains the communication information from the content server via the communication controller to start transmission of the communication information to the access terminal, and transmits a communication information transmission request to an adjacent base station by referring to the sector state managing table, the communication information transmission request including at least an ID of the communication information, an ID of the own sector, and the group number, and
wherein for each adjacent sector, the adjacent base station containing the each adjacent sector receives the communication information transmission request, refers to the sector state managing table, if the group number to which the sector belongs is equal to the group number included in the communication information transmission request, the adjacent base station establishes a path to the communication controller, and
obtains the communication information from the content server via the communication controller to start transmission of the communication information to the access terminal.

2. A radio communication system including:
a plurality of base stations;
a communication controller connecting the plurality of base stations with a communication network; and
a content server connected to the communication network,
wherein the plurality of base stations transmit same communication information to an access terminal at a same timing and the access terminal combines the communication information received from the plurality of base stations at the same timing,
wherein each of the base station includes a plurality of sectors,
wherein each of the base stations includes a table, which stores the sector number for identifying the correspondent sector and the parameter for identifying the group of the sectors which transmit the same communication information at the same timing, the parameter being a standard based on which whether a communication information transmission request is transmitted to the associated sector is determined,
wherein each access terminal includes means for obtaining a positional information of own access terminal,
wherein, during transmission of the communication information from a first base station to the access terminal, if the first base station receives an addition request of the communication information from the access terminal, the addition request including at least an ID of the sector selected by the access terminal based on the positional information of own access terminal, positional information of a second base station and the parameter, the first base station transmits the communication information transmission request to the sector whose ID is included in the addition request, the communication information transmission request including at least an ID of the communication information and an ID of the own sector, and
wherein the second base station including the sector which receives the communication information transmission request establishes a path to the communication controller, and obtains the communication information from the content server via the communication controller to start transmission of the communication information to the access terminal.

3. The radio communication system in accordance with claim 2, wherein a distance between the access terminal the first base station is used as the parameter.

4. A radio communication system including:
a plurality of base stations;
a communication controller connecting the plurality of base stations with a communication network; and
a content server connected to the communication network,
wherein the plurality of base stations transmit same communication information to an access terminal at a same timing and the access terminal combines the communication information received from the plurality of base stations at the same timing,
wherein each of the base stations includes a plurality of sectors,
wherein each of the base stations includes a table for storing a sector ID for identifying the sector, a parameter, and a positional information, the parameter is configured for identifying the group of the sectors which transmit the same communication information at the same timing, and
wherein, during transmission of the communication information from a first base station to the access terminal, when the first base station receives an addition request of the communication information from the access terminal, the first base station sends the communication information transmission request to an adjacent base station, the communication information transmission request including at least an ID of the communication information and an ID of own sector, the positional information of the first base station, and the parameter, and the adjacent base station, including the sector which receives the communication information transmission request, refers to the table, calculates a distance between own base station and the first base station using the positional information of the first base station included in the communication information transmission request and the positional information of own base station, compares the calculation results with the parameter, if the calculation result is smaller than the parameter, establishes a path to the communication controller, obtains the communication information from the content server via the communication controller to start transmission of the communication information to the access terminal.

5. A radio communication system including:

a plurality of base stations;

a communication controller connecting the plurality of base stations with a communication network; and a content server connected to the communication network, wherein the plurality of base stations transmit same communication information to access an access terminal at a same timing and the access terminal combines the communication information received from the plurality of base stations at the same timing, wherein each of the base stations includes a plurality of sectors, and wherein the access terminal measures powers received from the plurality of base stations, determines n sectors (n is a positive integer) having the power higher than a predetermined power threshold by comparing the measured powers with the predetermined power threshold, and sends viewing request including information of the n sectors to a first base station, the first base station, in response to received of the viewing request, collects the information on the sectors included in the viewing request, determines the sectors, and sends the transmission request including at least an ID of the communication information to the determined sectors, and a second base station, including the sector which receives the transmission request, establishes a path to the communication controller and obtains the communication information from the content server via the communication controller to start transmission of the communication information to the access terminal.

\* \* \* \* \*